(12) United States Patent
Kim et al.

(10) Patent No.: US 10,559,994 B2
(45) Date of Patent: Feb. 11, 2020

(54) LINEAR VIBRATION MOTOR

(71) Applicant: MPLUS CO., LTD., Suwon-si, Gyeonggi-do (KR)

(72) Inventors: Yong Tae Kim, Suwon-si (KR); Nam Sock Kim, Suwon-si (KR); Tae Hoon Lee, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 357 days.

(21) Appl. No.: 15/642,478

(22) Filed: Jul. 6, 2017

(65) Prior Publication Data

US 2018/0019634 A1    Jan. 18, 2018

(30) Foreign Application Priority Data

Jul. 15, 2016 (KR) .................. 10-2016-0090243

(51) Int. Cl.
*H02K 41/02* (2006.01)
*H02K 5/04* (2006.01)
(Continued)

(52) U.S. Cl.
CPC ............. *H02K 5/04* (2013.01); *H02K 1/06* (2013.01); *H02K 11/0094* (2013.01); *H02K 33/00* (2013.01); *H02K 33/16* (2013.01)

(58) Field of Classification Search
CPC .................................. H02K 5/04; H02K 33/00
(Continued)

(56) References Cited

U.S. PATENT DOCUMENTS 6,777,895 B2 * 8/2004 Shimoda ................ B06B 1/045
                                                                 318/114
7,474,018 B2 * 1/2009 Shimizu .............. A61C 17/3445
                                                                 310/12.22
(Continued)

FOREIGN PATENT DOCUMENTS

| KR | 10-1101330 B1    | 12/2011 |
| KR | 10-2012-0054685 A | 5/2012  |
| KR | 10-2014-0125476 A | 10/2014 |

OTHER PUBLICATIONS

KIPO Office Action for Korean Application No. 10-2016-0090243 dated Nov. 28, 2017 which corresponds to the above-referenced U.S. application.

*Primary Examiner* — Alexander Talpalatski
(74) *Attorney, Agent, or Firm* — LRK Patent Law Firm

(57) ABSTRACT

A linear vibration motor for fixing a ring-shaped coil provided within the linear vibration motor using a simpler structure. A linear vibration motor in which an upper casing and a bracket are configured to have an integrated shape and fixed to the inside or upper side of the coil to form magnetism, thereby facilitating fabrication due to a simple structure, preventing a reduction of a vibration power through a small space, and minimizing a rise of a material cost. Accordingly, the coil within the internal space of the casing is stably fixed by providing a structure for fixing the coil through the simple process of the bracket itself. Furthermore, since parts forming the vibration motor and the linear vibration motor are integrated, an assembly process is simplified, performance is satisfied by realizing a reduced production cost, and a working process and price competitiveness is secured.

11 Claims, 7 Drawing Sheets

(51) Int. Cl.
  *H02K 33/16* (2006.01)
  *H02K 1/06* (2006.01)
  *H02K 11/00* (2016.01)
  *H02K 33/00* (2006.01)
(58) Field of Classification Search
  USPC .................................................. 310/12.15
  See application file for complete search history.

(56) References Cited

U.S. PATENT DOCUMENTS

| | | | | |
|---|---|---|---|---|
| 8,106,546 | B2* | 1/2012 | Yamazaki | H02K 33/16 |
| | | | | 310/15 |
| 8,872,394 | B2* | 10/2014 | Shim | H02K 33/16 |
| | | | | 310/25 |
| 9,621,015 | B2* | 4/2017 | Katada | H02K 33/00 |
| 2005/0162105 | A1* | 7/2005 | Yamasaki | B06B 1/0246 |
| | | | | 318/114 |
| 2013/0342034 | A1* | 12/2013 | Moon | B06B 1/045 |
| | | | | 310/25 |
| 2016/0172950 | A1* | 6/2016 | Shim | H02K 33/16 |
| | | | | 310/25 |

* cited by examiner (a)

(b)

(a)

(b)

LINEAR VIBRATION MOTOR

CROSS REFERENCE TO RELATED APPLICATION

The present application claims the benefit of Korean Patent Application No. 10-2016-0090243, filed in the Korean Intellectual Property Office on Jul. 15, 2016, the entire content of which is incorporated herein by reference.

BACKGROUND OF THE INVENTION

1. Technical Field

The present invention relates to a linear vibration motor providing a configuration capable of fixing a coil of a ring shape provided within the linear vibration motor using a simpler structure.

2. Description of Related Art

Recently, as the market of a mobile device is expanded, various technologies which may be implemented in the mobile device are developed. A haptic function applied to the mobile device is one of the technologies. Recently, the size of the entire device is reduced through the improvement of an internal structure, such as a reduction in the size of a vibration generation device that implements the haptic function and a reduction in the thickness thereof.

For example, a conventional technology, such as Patent Document 1, has adopted a configuration in which a yoke of a T shape is coupled to a bracket forming a vibration generation device in order to secure a sufficient vibration power and also to prevent the size of the vibration generation device from being excessively increased.

However, such a conventional technology has problems in that it requires an additional process for the bracket in order to connect the yoke to the bracket, a lot of man power and time are required because the yoke suitable for the condition of the bracket must be separately fabricated, and a production cost is increased because the number of parts forming the inside of the vibration generation device is increased.

Accordingly, there is a need for a technology capable of reducing the number of parts forming the inside of a vibration generation device, simplifying an assembly process, and reducing a production cost.

PRIOR ART DOCUMENT

Patent Document (Patent Document 1) KR 1101330

SUMMARY OF THE INVENTION

Accordingly, the present invention has been made keeping in mind the above problems occurring in the prior art, and an object of the present invention is to stably fix a coil provided in the internal space of a casing by providing a structure for fixing the coil through the simplification of a process of processing a bracket itself, to simplify an assembly process by integrating parts that form a vibration motor and a linear vibration motor, to satisfy performance by realizing a reduction of a production cost, and to secure a working process and price competitiveness.

A linear vibration motor according to an embodiment of the present invention includes a casing 2 configured to have an internal space and to include a circular casing center extension part 21 which is disposed at the center and has a shape downward extended in multiple stages, a bracket 3 coupled to the bottom of the casing 2 to form an external appearance of the linear vibration motor and configured to include a circular bracket center extension part 31 which is disposed at the center and has a shape upward extended in multiple stages, a circular coil 4 configured to fix the lateral surfaces of the casing center extension part 21 and the bracket center extension part 31 by coupling the casing center extension part 21 and the bracket center extension part 31, an elastic body 5 configured to have one side fixed to one, surface on the inside of the casing 2 and the other side coupled to a vibrator 7, and an FPCB 6 fixed to one surface on the top of the bracket 3 and configured to electrically connect the coil and an external device.

A processed part 211, 311 cut, in a specific shape may be disposed in the center extension part 21, 31 of at least any one of the casing center extension part 21 and the bracket center extension part 31.

At least one processed part 211, 311 may be disposed in a circumferential direction along the lateral side of the center extension part 21, 31.

Furthermore, the end parts 212 and 312 of the casing center extension part 21 and the bracket center extension part 31 may come into contact with each other or may have a gap 8 of 0.2 mm or less.

In this case, the elastic body may have one side fixed to one surface on the upper side of the bracket 3 and the other side.

Additionally, the vibrator 7 may include a magnet 71 of a ring shape, a weight body 72 of a ring shape coupled to the lateral surface of the magnet, an upper yoke 73 disposed on the top of the magnet, and a lower yoke 74 disposed at the bottom of the magnet.

The magnet 71 may include one magnet or may have a structure in which an upper magnet 711 and a lower magnet 712 are coupled.

Furthermore, wherein the vibrator 7 may further include a central yoke 75 disposed between the upper magnet 711 and the lower magnet 712.

DETAILED DESCRIPTION

Figure 1:
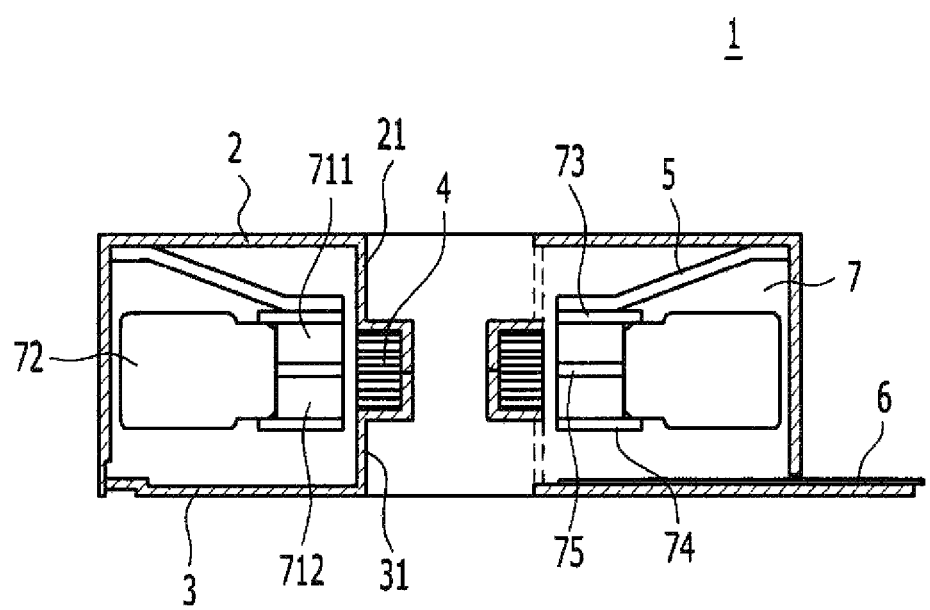
FIG. 1 is, a cross-sectional view of a linear vibration motor including the center extension parts of a casing and a bracket according to an embodiment of the present invention.

Hereinafter, some embodiments of the present invention are described in detail with reference to illustrative drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of the present invention, terms, such as the first, the second, A, B, (a), and (b), may be used. However, although the terms are used only to distinguish one element from the other element, the essence, order, or sequence of the elements is not limited by the terms. When it is said that one element is "connected", "combined", or "coupled" to the other element, the one element may be directly connected or coupled" to the other element, but it should also be understood that a third element may be "connected", "combined", or "coupled" between the two elements.

FIG. 1 is a cross-sectional view of a linear vibration motor including the center extension parts of a casing and a bracket according to an embodiment of the present invention.

A basic structure of a linear vibration motor 1 according to an embodiment of the present invention is described in detail with reference to FIG. 1.

For reference, FIG. 1 shows only the half of the linear vibration motor having a symmetrical structure. This is for clearly showing an internal structure of the linear vibration motor. Accordingly, it should be understood that the remaining half of the linear vibration motor omitted in the drawing has been extended from the illustrated structure having a symmetrical form. It is to be noted that such a symmetrical form is omitted in other drawings in the same manner.

It may be seen that the linear vibration motor of FIG. 1 includes a casing 2 configured to perform a cover function on the upper side and a bracket 3 configured to perform a function of supporting the bottom surface.

More specifically, the linear vibration motor 1 may include the casing 2 configured to have an internal space and to include a circular casing center extension part 21 which is disposed at the center and has a shape downward extended in multiple stages, the bracket 3 coupled to the bottom of the casing 2 to form an external appearance of the linear vibration motor and configured to include a circular bracket center extension part 31 which is disposed at the center and has a shape upward extended in multiple stages, a circular coil 4 configured to fix the lateral surfaces of the casing center extension part 21 and the bracket center extension part 31 by coupling the casing center extension part 21 and the bracket center extension part 31, an elastic body 5 configured to have one side fixed to one surface on the inside of the casing 2 and the other side coupled to a vibrator 7, and an FPCB 6 fixed to one surface on the top of the bracket 3 and configured to electrically connect the coil and an external device.

The center extension part 21, 31 may be fabricated in such a way as to be inward pressed in using a press or deep drawing method. Accordingly, a structure capable of stably fixing the coil 4 can be implemented by a single simple process.

Furthermore, the center extension part 21, 31 has a structure extended into the coil 4 downward and upward. Accordingly, an electromagnetic field can be generated in a relation with the coil 4 without a separate yoke assembly.

Accordingly, there are effects in that a product structure can be simplified, productivity can be improved and a manufacturing cost can be reduced by providing the structure for fixing the coil 4 through a simple press process.

In this case, the coil 4 may be fixed to have a ring shape on the outside of the casing and the bracket center extension parts 21 and 31 press-in-processed to be identical with the size of the coil, but may be attached and fixed outside the casing and the bracket center extension parts 21 and 31 through a separate adhesive material.

Figure 2:
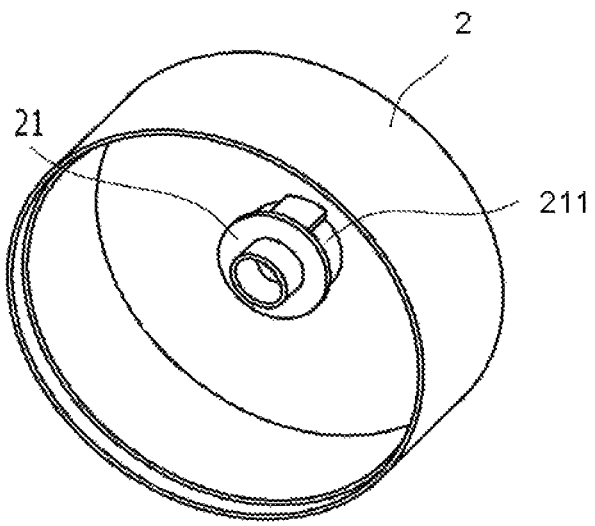
FIG. 2 is a perspective view of the center extension parts of the casing and the bracket according to an embodiment of the present invention.
Figure 2:
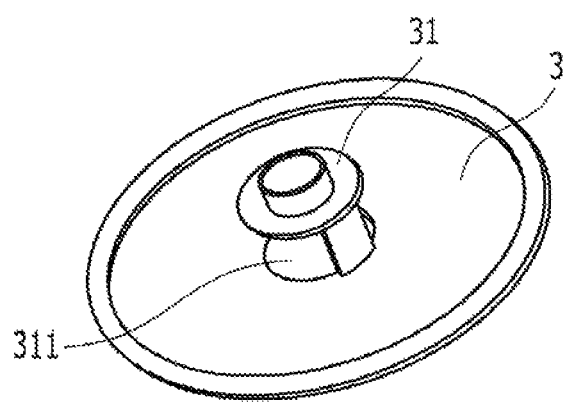

FIG. 2 is a perspective view of the center extension parts of the easing and the bracket according to an embodiment of the present invention.

As shown in FIG. 2, processed parts 211 and 311 that have been cut in a specific shape may be disposed in the casing and the extension parts of the bracket center extension parts 21 and 31.

Figure 3:
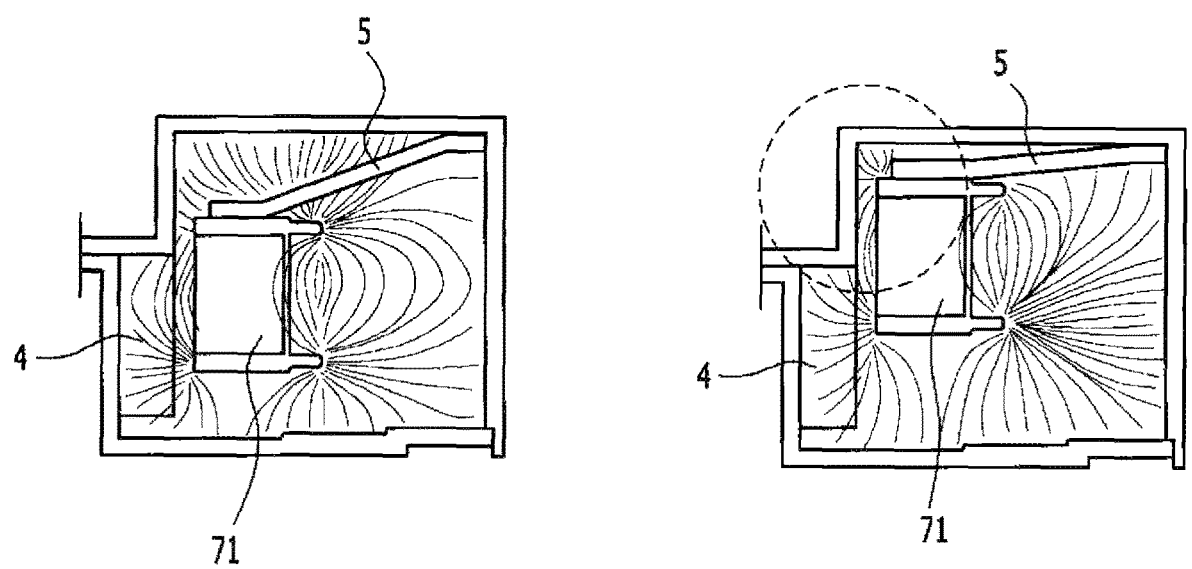
FIG. 3 shows a magnetic force formed between the magnet and the extension parts when the processed parts shown in FIG. 2 are absent.

The role of the processed parts 211 and 311 is described below. As shown in FIG. 3, if the processed parts are not present, when a magnet 71 moves up/down, magnetism is formed between the magnet 71 and the extension parts 21 and 31 not including the processed parts 212 and 213. Accordingly, there is a problem in that the magnet 71 does not generate a sufficient displacement when it moves upward.

Accordingly, if the processed parts 212 and 312 according to the present embodiment are configured, when the magnet 71 moves up/down, the magnetic flux density of the magnet 71 and the extension parts 21 and 31 is reduced, thereby being capable of increasing the magnetic flux of the coil 4 and the magnet 71. Accordingly, a structure design for generating a strong vibration power is made possible because the magnet 71 can actively move up/down.

Furthermore, one or more processed parts 211 and 311 may be disposed in a circumferential direction along the lateral surfaces of the center extension parts 21 and 31.

Figure 4:
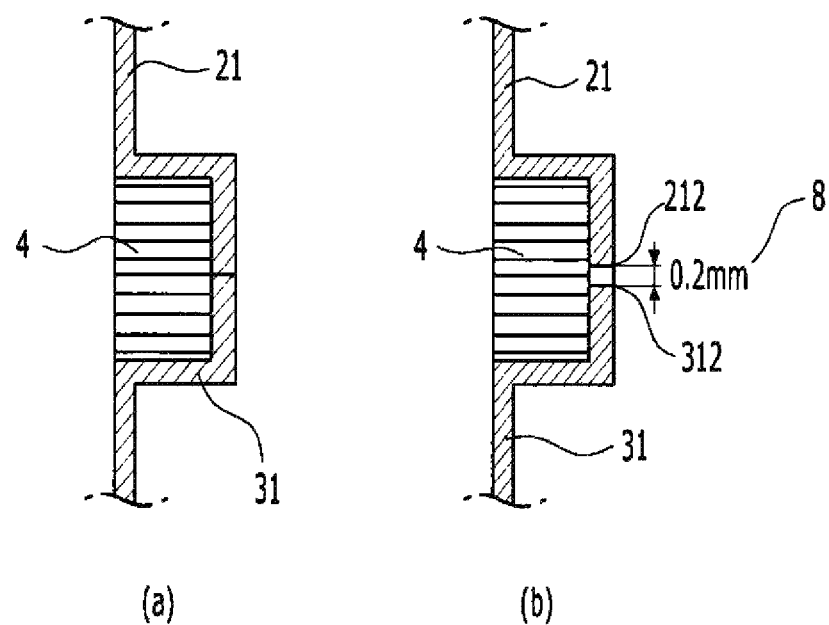
FIG. 4 is an enlarged view of a cross-section of the center extension parts of the casing and the bracket and a coil coupled to the center extension parts according to an embodiment of the present invention.

FIG. 4 is an enlarged view of a cross-section of the center extension parts of the casing and the bracket and the coil coupled, to the center extension parts according to an embodiment of the present invention.

FIG. 4 shows a linear vibration motor 1 in which the end parts 212 and 312 of the casing center extension part 21 and the bracket center extension part 31 come into contact with each other or have a gap 8 of 0.2 mm or less.

Such an embodiment is described in detail below. The center extension parts 21 and 31 that surround the inside of the coil 4 play the role of a yoke, and correspond to parts which increase the intensity of an electromagnet.

Accordingly, if a gap is present, between the center extension parts 21 and 31, it is difficult to secure a sufficient vibration power because an electromagnetic force is reduced that much.

Figure 5:
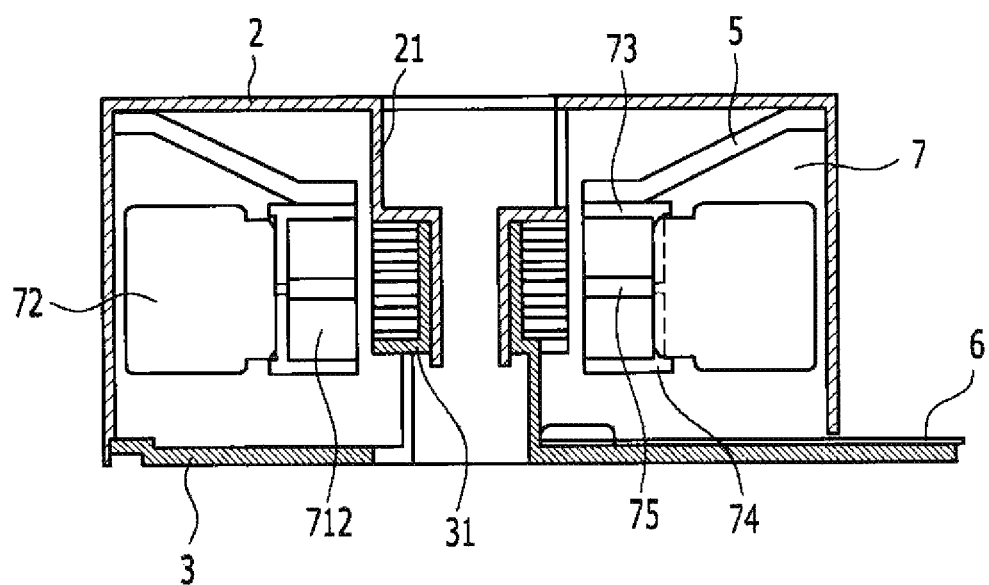
FIG. 5 shows that the center extension parts of the present invention is formed in an overlapping structure.

As shown in FIG. 5, if the center extension parts 21 and 31 are configured to be overlapped, an electromagnetic force can be further improved because an effect in that the thickness of the yoke is increased is obtained.

Figure 6:
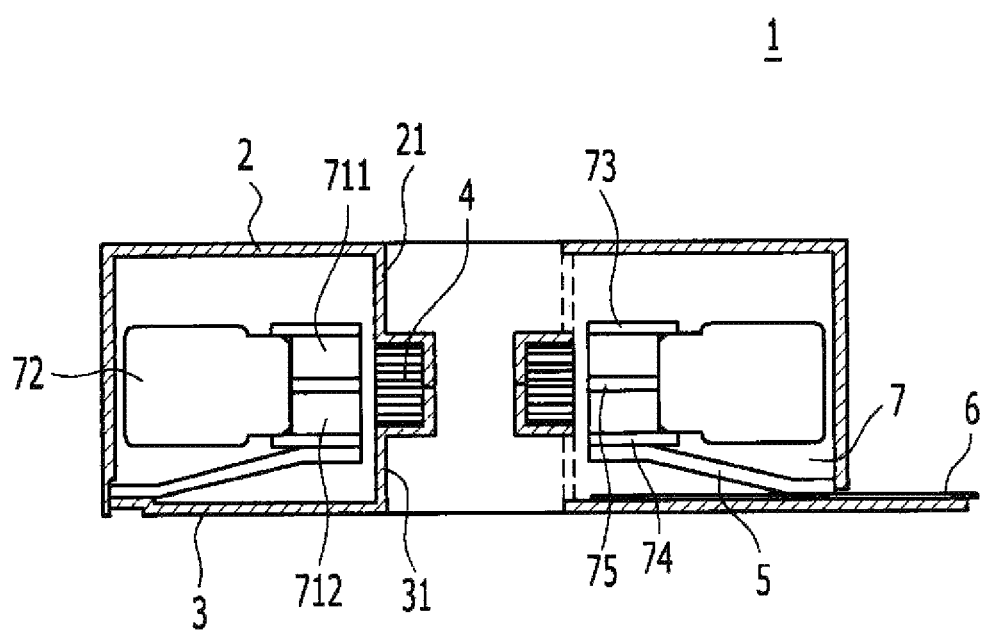
FIG. 6 is a cross-sectional view of a linear vibration motor including the center extension parts of the casing and the bracket according to an embodiment of the present invention.

FIG. 6 is a cross-sectional view of a linear vibration motor including the center extension parts of the casing and the bracket according to an embodiment of the present invention.

Referring to FIG. 6, the elastic body 5 does not need to be essentially attached to one surface on the inside of the casing 2, but may be disposed on one surface on the top of the bracket 3, if necessary.

Additionally, the structure of the aforementioned vibrator and the magnet are described in detail below.

The vibrator 7 may include the magnet 71 of a ring shape, a weight body 72 of a ring shape coupled to the lateral surface of the magnet, an upper yoke 73 provided on the top of the magnet, and a lower yoke 74 provided on the bottom of the magnet.

Specifically, the weight body 72 functions to help the addition of a vibration power according to the up/down movement of the vibrator 7. The yokes 73 and 74 provided on the top and bottom of the magnet 71 function to increase an electromagnetic force.

In this case, the magnet 71 may include one magnet or have a structure in which an upper magnet 711 and a lower magnet 712 are coupled.

The reason for this is that when the two or more magnets 711 and 712 are added, a stronger electromagnetic force can be generated.

The vibrator 7 may further include a central yoke 75 provided between the upper magnet 711 and the lower magnet 712.

Figure 7:
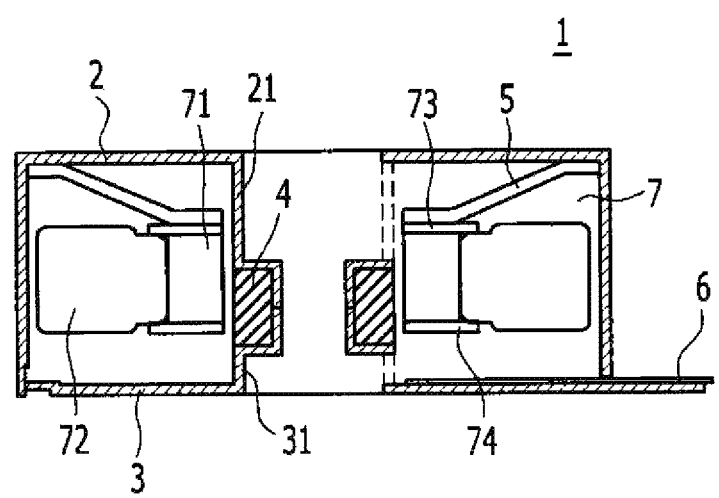
FIG. 7 is a cross-sectional view of a linear vibration motor including the center extension parts of a casing and a bracket according to an embodiment of the present invention.
Figure 7:
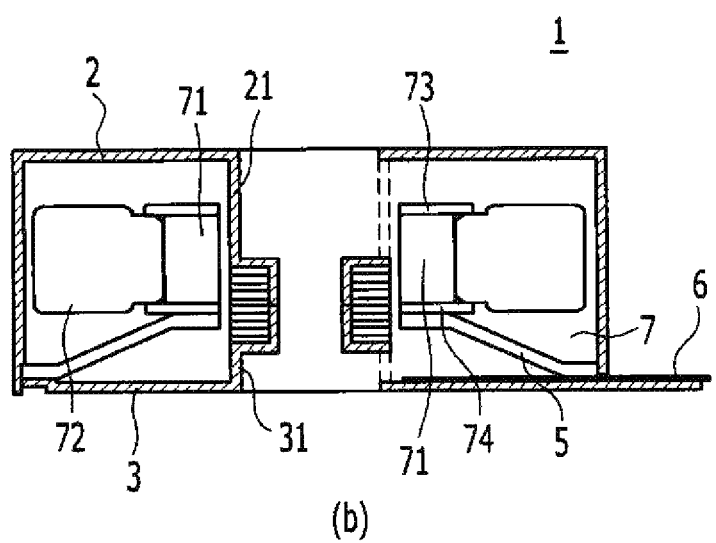

FIG. 7 is a cross-sectional view of a linear vibration motor including the center extension parts of a casing and a bracket according to an embodiment of the present invention.

The present embodiment corresponds to a case where the coil 4 and the magnet 71 are disposed if the magnet 71 has a sufficient magnetism or the coil 4 has a sufficient electromagnetic force.

The coil 4 may be spaced apart from the magnet 71 in the up/down direction of the magnet 71. The magnet 71 may be changed from a structure including two or more magnets to a structure including one magnet.

Accordingly, a problem in that a vibration characteristic is deteriorated due to the excessive magnetism of the magnet 71 or the excessive electromagnetic force of the coil 4 can be solved.

The linear vibration motor according to an embodiment of the present invention can be easily fabricated in such a way as to be inward pressed in using a press or deep drawing method and can fix the coil through a stable structure.

Furthermore, performance can be satisfied by realizing a reduction of a production cost and a working process and price competitiveness can be secured.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed as limiting the technological spirit of the present invention, but should be construed as illustrating the technological spirit of the present invention. The scope of the technological spirit of the present invention is not restricted by the embodiments, and the range of protection of the present invention should be interpreted based on the following appended claims. Accordingly, the present invention should be construed as covering all modifications or variations derived from the meaning and scope of the appended claims and their equivalents.

What is claimed is:

1. A linear vibration motor (1) comprising:
    a casing (2) configured to have an internal space and to comprise a circular casing center extension part (21) which is disposed at a center and has a shape downward extended in multiple stages;
    a bracket (3) coupled to a bottom of the casing (2) to form an external appearance of the linear vibration motor and configured to comprise a circular bracket center extension part (31) which is disposed at the center and has a shape upward extended in multiple stages;
    a circular coil (4) configured to fix lateral surfaces of the casing center extension part (21) and the bracket center extension part (31) by coupling the casing center extension part (21) and the bracket center extension part (31);
    an elastic body (5) configured to have one side fixed to one surface on an inside of the casing (2) and the other side coupled to a vibrator (7); and
    an FPCB (6) fixed to one surface on a top of the bracket (3) and configured to electrically connect the coil and an external device.

2. The linear vibration motor of claim 1, wherein a processed part (211, 311) cut in a specific shape is disposed in the center extension part (21, 31) of at least any one of the casing center extension part (21) and the bracket center extension part (31).

3. The linear vibration motor of claim 2, wherein at least one processed part (211, 311) is disposed in a circumferential direction along a lateral side of the center extension part (21, 31).

4. The linear vibration motor of claim 1, wherein end parts (212) and (312) of the casing center extension part (21) and the bracket center extension part (31) have a gap 8 of 0.2 mm or less.

5. The linear vibration motor of claim 1, wherein the vibrator (7) comprises:
    a magnet (71) of a ring shape;
    a weight body (72) of a ring shape coupled to a lateral surface of the magnet;
    an upper yoke (73) disposed on a top of the magnet; and
    a lower yoke (74) disposed at a bottom of the magnet,
    wherein the magnet (71) comprises one magnet or has a structure in which an upper magnet (711) and a lower magnet (712) are coupled.

6. A linear vibration motor (1) comprising:
    a casing (2) configured to have an internal space and to comprise a circular casing center extension part (21) which is disposed at a center and has a shape downward extended in multiple stages;
    a bracket (3) coupled to a bottom of the casing (2) to form an external appearance of the linear vibration motor and configured to comprise a circular bracket center extension part (31) which is disposed at the center and has a shape upward extended in multiple stages;
    a circular coil (4) configured to fix lateral surfaces of the casing center extension part (21) and the bracket center extension part (31) by coupling the casing center extension part (21) and the bracket center extension part (31);
    an elastic body (5) configured to have one side fixed to one surface on an upper side of the casing (2) and the other side coupled to a vibrator (7); and
    an FPCB (6) fixed to one surface on a top of the bracket (3) and configured to electrically connect the coil and an external device.

7. The linear vibration motor of claim 6, wherein a processed part (211, 311) cut in a specific shape is disposed in the center extension part (21, 31) of at least any one of the casing center extension part (21) and the bracket center extension part (31).

8. The linear vibration motor of claim 7, wherein at least one processed part (211, 311) is disposed in a circumferential direction along a lateral side of the center extension part (21, 31).

9. The linear vibration motor of claim 6, wherein end parts (212) and (312) of the casing center extension part (21) and the bracket center extension part (31) have a gap 8 of 0.2 mm or less.

10. The linear vibration motor of claim 6, wherein the vibrator (7) comprises:
   a magnet (71) of a ring shape;
   a weight body (72) of a ring shape coupled to a lateral surface of the magnet;
   an upper yoke (73) disposed on a top of the magnet; and
   a lower yoke (74) disposed at a bottom of the magnet,
   wherein the magnet (71) comprises one magnet or has a structure in which an upper magnet (711) and a lower magnet (712) are coupled.

11. The linear vibration motor of claim 10, wherein the vibrator (7) further comprises a central yoke (75) disposed between the upper magnet (711) and the lower magnet (712).

* * * * *